United States Patent [19]

Miller, Jr. et al.

[11] 3,959,641

[45] May 25, 1976

[54] DIGITAL RANGEFINDER CORRELATION

[75] Inventors: Walter E. Miller, Jr.; Irvin E. Dent, both of Huntsville, Ala.

[73] Assignee: The United States of America as represented by the Secretary of the Army, Washington, D.C.

[22] Filed: Dec. 5, 1974

[21] Appl. No.: 529,973

[52] U.S. Cl. ........................... 235/181; 235/150.53; 328/165; 343/5 DP; 356/5
[51] Int. Cl.² .................... G06F 15/34; G01C 3/08
[58] Field of Search .......... 235/181, 150.53, 92 EV, 235/92 NT; 307/235, 237; 328/165; 343/5 DP, 17.1 R, 13; 356/4, 5

[56] References Cited
UNITED STATES PATENTS

| | | | |
|---|---|---|---|
| 3,646,588 | 2/1972 | Van Popta | 343/5 DP |
| 3,678,252 | 7/1972 | Payne | 235/92 EV |
| 3,701,954 | 10/1972 | Seminatore et al. | 307/235 |
| 3,737,790 | 6/1973 | Brown | 307/237 |
| 3,738,749 | 6/1973 | Everest | 343/5 DP |
| 3,758,868 | 9/1973 | Brown | 307/237 |
| 3,781,888 | 12/1972 | Bail | 343/5 DP |
| 3,792,245 | 2/1974 | Hocker et al. | 235/181 |

Primary Examiner—Felix D. Gruber
Attorney, Agent, or Firm—Nathan Edelberg; Robert P. Gibson; Robert C. Sims

[57] ABSTRACT

Correlation in time of the extremely high frequency pulses which occur in optical rangefinders is accomplished by thresholding received returns at a low thresholding value, steering each received pulse to a plurality of up/down counters such that half of the time a counter is counting up and half of the time the counter is counting down. Dividing the up/down time of the counters in a digital format so as to provide a digital range readout from the up/down counters.

4 Claims, 4 Drawing Figures

DIGITAL RANGEFINDER CORRELATION

BACKGROUND OF THE INVENTION

The specific requirement which led to the development of this invention was a desire to operate a laser rangefinder at as low a transmitter power as possible, permitting multiple attempts in order to compensate for a very poor S/N ratio. Typical systems now operate with a threshold level, as follows:

1. A voltage threshold is established above the noise level, such that an acceptable false alarm rate is achieved.

2. A signal level is required which will normally be above this threshold level, thus activating "signal present" circuitry upon each crossing of the threshold.

3. Typical threshold to noise voltage ratios vary from 3 to 10, depending on false alarm rates acceptable, and S/N availability. If a low dropout rate (missed signal pulse) is also required, a similar signal to threshold ratio may also be required. Thus operating S/N ratios vary from a minimum of about 3 to very large numbers.

SUMMARY OF THE INVENTION

This invention consists of a method for the correlation of pulses by digital means, wherein the time of the occurrences after a specific "start" time is the unique feature upon which correlation is made. A specific method for relating one signal to all others and separating the new unique (repetitive) signal from among the random noise is set forth by this invention. It also provides parallel correlators which, when applied to the rangefinder, results in a digital format readout of range directly from the correlators. The system may be operated many times, and the decision as to whether a voltage is due to a signal or to a noise is made on statistical variation of the noise. Operation at much lower S/N ratios are achieved. For example, in the rangefinder application, noise will cause false alarms equally at all ranges, while a true signal will always occur at the same (true target) range. Thus the range which occurs most often would be the correct range.

DESCRIPTION OF THE PREFERRED EMBODIMENT

Figure 1:
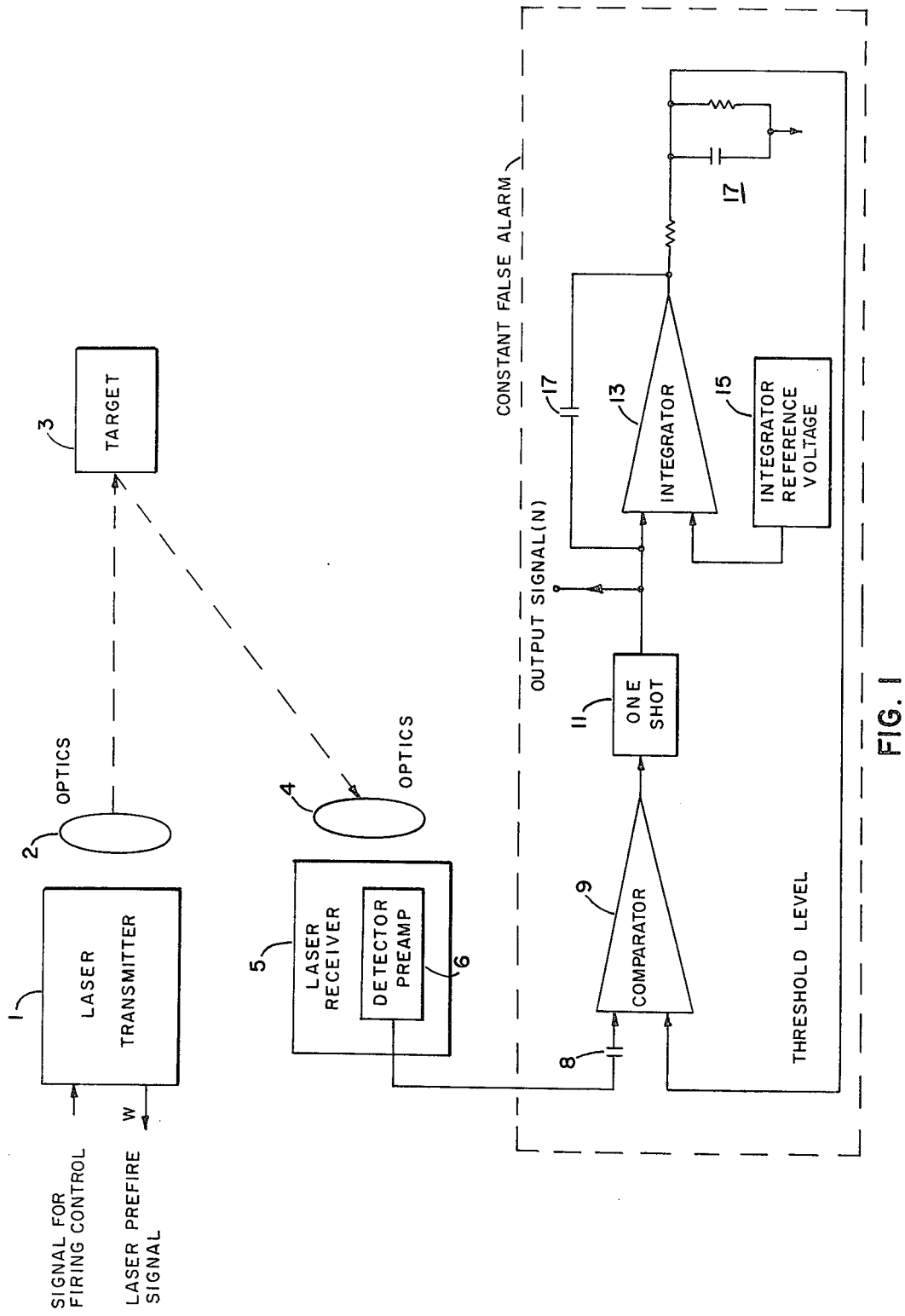
FIG. 1 shows in block form the rangefinder system and the thresholding circuit.
Figure 3:
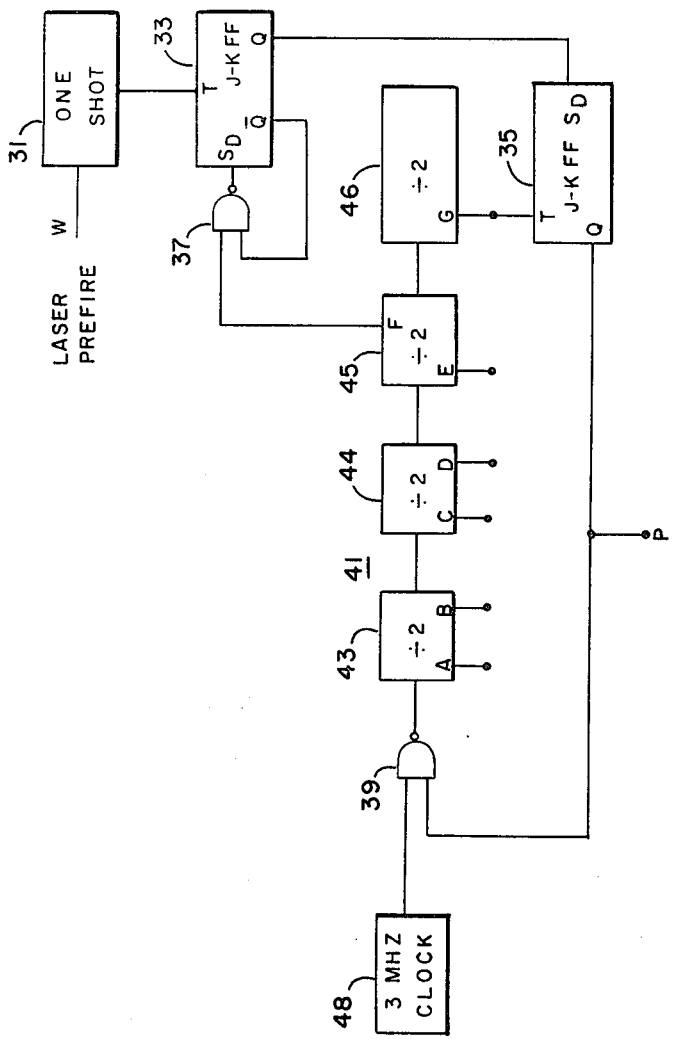
FIG. 3 is a block diagram showing of the divider and its enabling circuitry.
Figure 2:
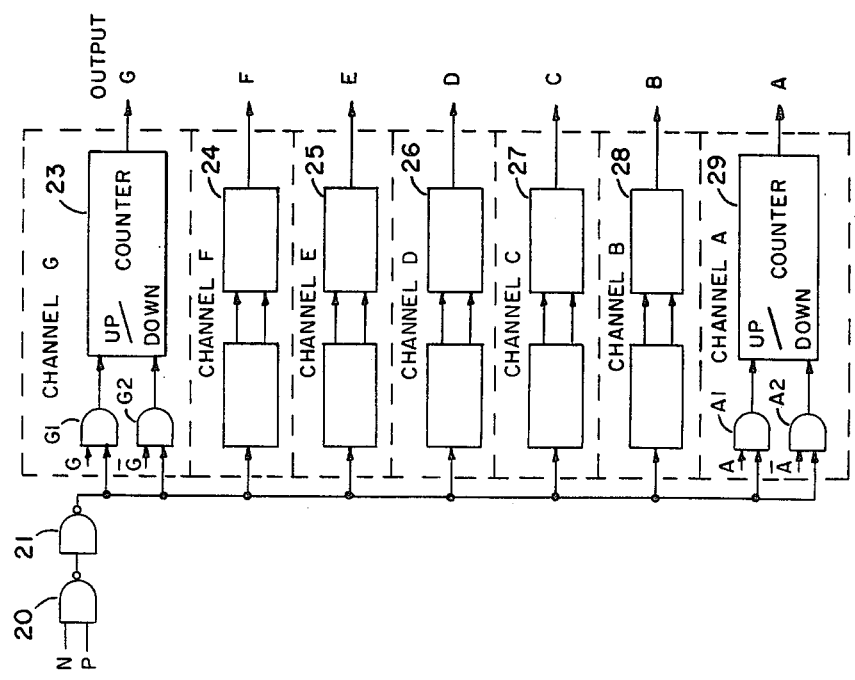
FIG. 2 is a block diagram showing of the basic correlator.

The specific circuitry tested for this invention is shown in FIGS. 1–3. FIG. 1 is the rangefinder receiver and constant false alarm circuit necessary to provide compatibility with the correlator. FIGS. 2 and 3 show the digital correlator circuitry.

a. Constant false alarm circuit

FIG. 1 shows a laser transmitter 1, optics 2 and 4, target 3, laser receiver 5, and detector/preamplifier 6 as conventionally employed. The time between the laser transmit pulse and laser received pulse is, of course, a measure of target range, due to the velocity of light. In addition, FIG. 1 depicts the constant false alarm circuit, which operates as follows:

1. The signal through capacitor 8 into the comparator 9 "fires" the comparator each time it rises above the comparator reference voltage. The comparator then fires a one-shot 11 whose width is fixed. Comparator 9 may take the shape of any of the well known devices such as a chip 710L.

2. The average voltage out of one-shot 11 is related to the one-shot firing rate, since the pulse width and peak voltage are fixed. The integrator 13 compares this average voltage to the adjustable reference voltage 15, and continues to increase or decrease its output voltage by way of feedback capacitor 17 until the two inputs are equal. This output voltage is resistively divided by divider 17 down to an appropriate low level, filtered, and then used as the reference voltage for the comparator. Thus by adjusting the integrator input reference voltage 15, the average number of comparator firings may be controlled, independent of changes in the amplitude of the signal and noise input.

3. The signal output N from this circuit is the one-shot output, which consists of a fixed amplitude, fixed width pulse, occurring on many noise pulses, and some signal pulses, depending on S/N ratio and false alarm rate selected.

b. Correlator Circuit

The correlator circuit consists of two major functions, the logic, and the memory. The logic functions provide digital waveforms relatable to range (time). The memory consists of commercial digital up/down counters which count both signal and noise.

1. Method of Correlation

Figure 4:
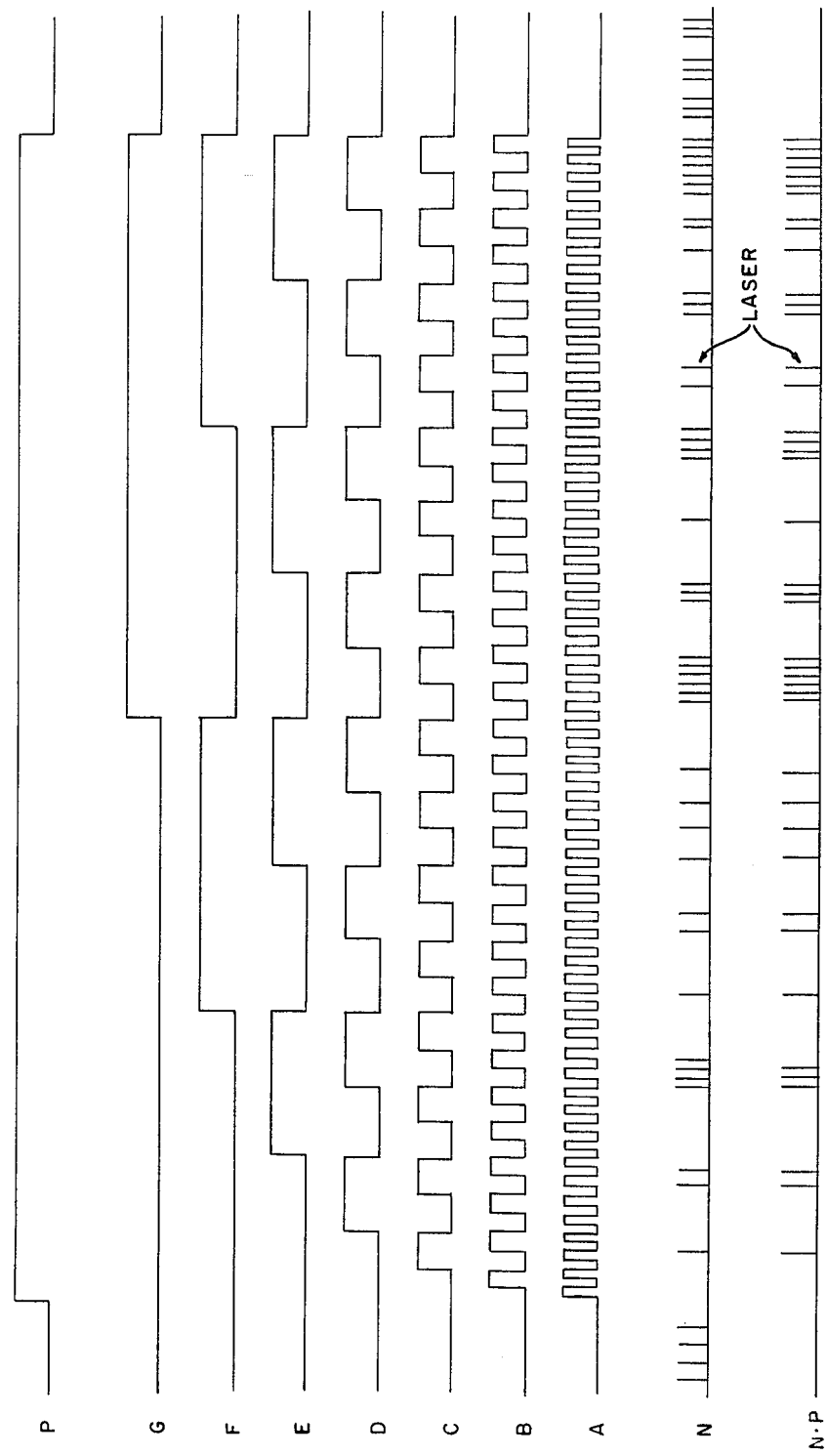
FIG. 4 is a showing of waveforms occurring in the digital logic circuit of the present invention.

FIG. 4 shows several of the waveforms occurring in the digital logic circuit. Consider first the G waveform, which is the lowest frequency waveform generated. This waveform is started after laser prefire and is terminated (by selection of clock frequency and number of flip-flops employed) at the maximum operation range of the system. The waveform up-clock then obviously divides the range (time) into two halves. The AND gates G1 and G2 of FIG. 2 which employ this waveform then switch the one-shot pulses N (from FIG. 1) into either the up, or to the down count input of counter 23, depending on which half of G waveform they coincide with. Random noise will occur evenly in both halves, and so will cause (on the average) a net count of zero. The true laser return, however, will always occur at the same range, and will result in a net negative count if less than one-half range, and a positive count if beyond half range. NAND gate 20 and inverter 21 limits the target range in which pulses N are counted. A reliable readout requires only that the variation of the random count due to noise (which may be either + or − during any given ranging attempt) be smaller than the number of laser returns counted. The polarity of the count will indicate laser return position within that waveform.

Similar up/down counters 24–29 and AND gates (A1, A2)–(F1, F2) for channels A–F employed on waveforms F through A then provide, in each case, a determination of true laser return location in either the positive or zero portion of that waveform. The polarity of all seven up/down counter is then a 7 bit digital word which indicates the range of the true laser returns.

2. Correlator circuitry

FIGS. 2 and 3 show functional block diagrams to the correlator circuits. Circuit operation will be explained by tracing signal flow and circuit response.

The first event is the firing of the laser transmitter 1 (FIG. 1). A pulse W (termed the laser prefire pulse) from the transmitter fires the one-shot 31. Purpose of this one-shot is to provide a delay before correlator operation to ensure that near field backscatter into the receiver, and receiver ringing due to RFI from the laser firing, are not included in the correlation. This also establishes a minimum range. The one-shot down clock triggers JK flip-flop 33 (which is so wired as to permit the trigger input to only cause the Q output to go to 0-down clocking of the flip-flop). This down clock sets direct a second flip-flop 35, and at the same time enables a NAND gate 37 which will set direct flip-flop 33 at some intermediate point of the counter. Flip-flops 33 and 35 are set ($Q = 1$) when the input to SD is 0. The setting of flip-flop 35 enables the NAND clock gate 39, so the divide chain 41 begins operation. When the final flip-flop 46 in the divide chain 41 down clocks ($\bar{Q}$ down clocks), flip-flop 35 in the counter enable circuit is triggered to the zero state (again JK wired so as to down clock only). This inhibits clock gate 39 in that a 1 output appears on its output regardless of the output of 3 MHZ clock 48, and the division will be stopped with all segments remaining in the high state until the next laser prefire pulse occurs. The A through G waveforms of this division are also those of FIG. 4. Outputs from flip-flops 43-46 are connected to AND gates A1-G1 of FIG. 2 and to AND gates A2-G2 after being inverted. Flip-flops 43-46 can be connected in a conventional counting circuit configuration. The inverse of each waveform is also available.

The clock enable waveform P, is gated with the signal + noise one-shot pulses N by NAND gate 20 and inverter 21 so that only those one-shot pulses that occur during counting operation are processed. This signal (P.N) is then gated by A1 and by A2 to provide the up and down count inputs, respectively, of the first up/down counter 29. Note that the counter 29 is not cleared after each laser firing, but instead a cumulative count is maintained. Clearing of this counter is not accomplished until the range readout is made, or immediately prior to firing the transmitter the first time in a ranging sequence. The (P.N) signal is similarly gated into parallel up/down counters for each waveform A through G. After a predetermined number of laser firings the total number of noise counts (both polarity, equal probability) plus the total number of laser returns above threshold (only one polarity within each channel) is stored in the up/down counter, and laser/firing ceases. The polarity of these counters at that time forms a 7 bit digital word indicative of target range. At this point the range may be fed directly to a digital computer (such as in a fire control computer application) or to a conventional D/A converter for visual range readout for a human operator.

It is obvious that in practice:

a. The more laser returns correlated, the more reliable a range may be determined at a smaller S/N ratio.

b. The up/down counters must have adequate capacity for the number of correlations desired, as counter overflow reverses polarity.

c. For very good S/N ratios, the constant false alarm rate circuit of FIG. 1 should be set at a low false alarm rate to reduce the effect of noise. This permits correlation on relatively few laser pulses.

d. For very poor S/N ratios, the constant false alarm rate must be increased in order to be triggered more often by very low level signal. This also provides a large number of noise triggers, so a larger number of laser firings must be used to achieve reliable range readout.

e. The circuit, while operating at extremely low S/N ratios (rangefinder can operate well at $S/N = 0.1$) is not sensitive to crosstalk, feedback, RFI, etc., in the correlator circuit, since it is entirely digital in nature. Protection against such internal noise sources need be provided only between the laser receiver and comparator.

We claim:

1. A system for detecting a time related signal in the presence of noise which occurs more often than the true signal occurs, comprising a receiver means connected to detect the signal and noise; first means dividing the length of time a single true signal can occur within into a plurality of equal parts; first through N detecting means connected to said first means and to said receiver means; said first detecting means being connected to sum up signal and noise occurrences in alternate one-half periods of time and to subtract from this sum the signal and noise occurrences in the remaining periods of time; the second detecting means being connected to sum up the noise and signal occurrences in alternate one-fourth periods of time and subtracting from this the noise and signal returns from the other periods of time; and connecting the third detector means through N detector means in the same manner as above in one-eighth, one-sixteenth . . . $1/N^N$ periods of time respectively.

2. A system as set forth in claim 1 wherein said system is cycled through a plurality of lengths of time wherein a true signal return can occur; and N is greater than 4.

3. A system as set forth in claim 2 wherein said detecting means are up/down counters; and said receiver means including a constant false alarm device.

4. A range finder system for detecting a time related signal in the presence of noise, said system employing digital means for correlating pulses comprising constant false alarm means connected to detect the signal and noise for generating fixed amplitude, fixed width pulses; a correlator comprising first means dividing the length of time a single true signal can occur within into a plurality of equal parts; first through N detecting means connected to said first means and to said false alarm means; said first detecting means being connected to sum up signal and noise occurrences in alternate one-half periods of time and to subtract from this sum the signal and noise occurrences in the remaining periods of time; the second detecting means being connected to sum up the noise and signal occurrences in alternate one-fourth periods of time and subtracting from this the noise and signal returns from the other periods of time; and connecting the third detector means through N detector means in the same manner as above in one-eighth, one-sixteenth . . . $1/N^N$ periods of time respectively whereby the output of said correlator means is indicative of range.

* * * * *